Figure 1:
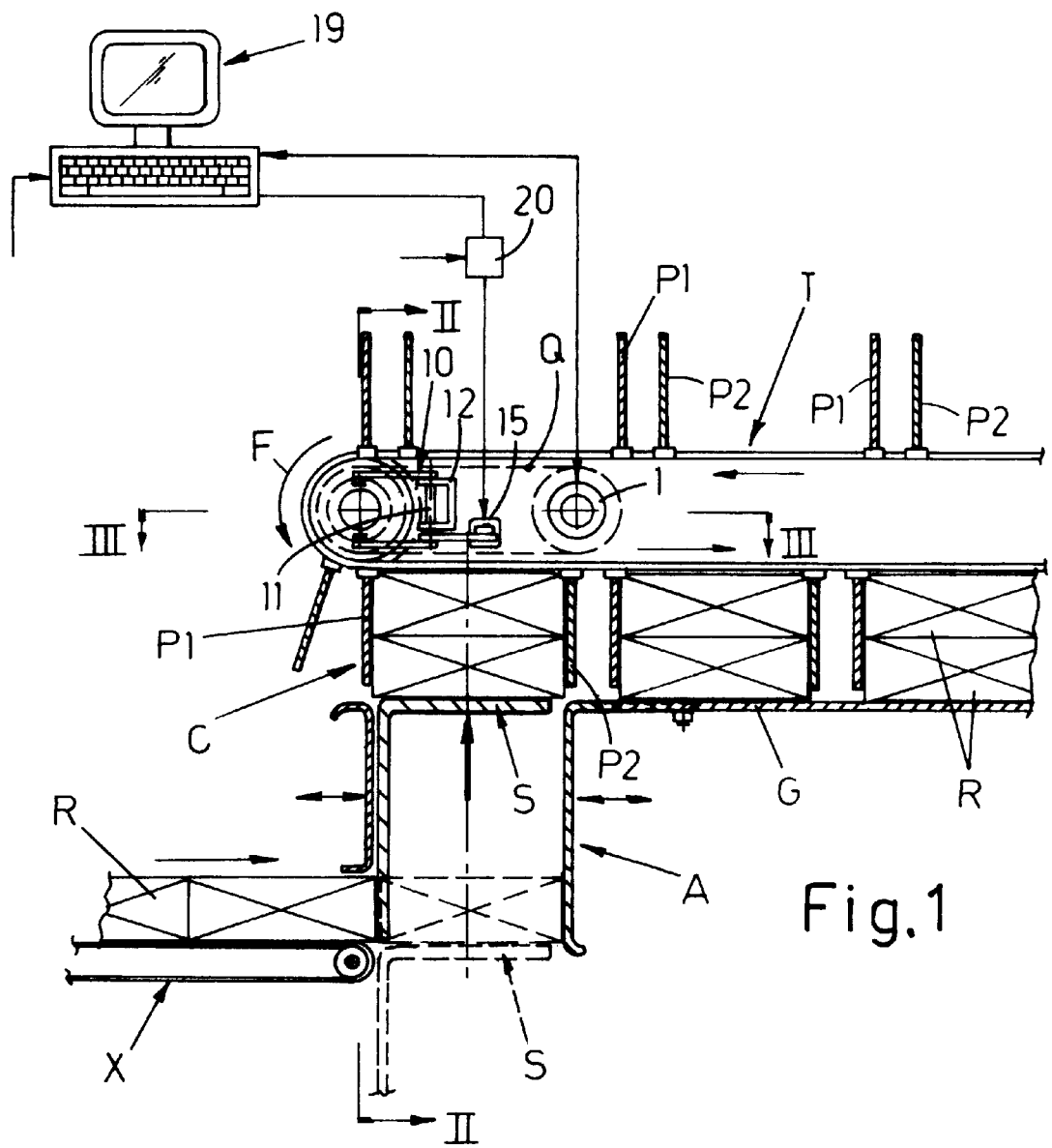

United States Patent
Cassoli et al.

[19]

[11] Patent Number: 6,161,678
[45] Date of Patent: Dec. 19, 2000

[54] APPARATUS FOR AUTOMATIC ADJUSTMENT OF THE LENGTH OF THE COMPARTMENTS OF THE CONVEYORS OF PACKAGING OR WRAPPING MACHINES

[75] Inventors: Paolo Cassoli, Casalecchio di Reno; Giorgio Bonafe', Casalecchio di R.; Giordano Gorrieri, Pianoro, all of Italy

[73] Assignee: Casmatic S.p.A., Italy

[21] Appl. No.: 09/289,582

[22] Filed: Apr. 12, 1999

[30] Foreign Application Priority Data

Sep. 1, 1998 [IT] Italy .................................. BO98A0509

[51] Int. Cl.[7] .................................................. B65G 15/14
[52] U.S. Cl. ........................................................ 198/626.6
[58] Field of Search ........................ 198/626.5, 718, 198/726, 803.13, 803.11, 867.08, 484.1, 470.1

[56] References Cited

U.S. PATENT DOCUMENTS 5,328,021  7/1994  Calvert et al. ................. 198/803.11
5,385,004  1/1995  Tolson ............................... 53/548
5,407,059  4/1995  Fochler ........................... 198/626.5

*Primary Examiner*—Christopher P. Ellis
*Assistant Examiner*—Rashmi Sharma
*Attorney, Agent, or Firm*—Larson & Taylor, PLC

[57] ABSTRACT

At least one driving sprocket (H1) and the neighbouring driven sprocket (H2) carrying the two pairs of chains of the compartment conveyor (T) are connected to each other by means of a dog clutch (2, 4) operated by an actuator (15) controlled by the control panel (19) of the packaging machine. The driving shaft (L) on which the said sprockets (H1, H2) are mounted is turned by an electric motor (1) of the electronic speed and phase control type. Adjustment of the length of the compartments (C) of the conveyor is effected automatically by the control panel (19) supplied with the necessary data, which stops the conveyor, opens the said dog clutch (2, 4), starts the said motor (1) so as to move one of the walls (P1) of the compartments by the amount required for the adjustment, and then closes the said dog clutch (2, 4) and, if required, restarts the said motor (1) so as to impart to the conveyor one half of the distance moved in the previous adjustment, forwards or backwards, in order to align the compartments with the product loading station (A).

4 Claims, 3 Drawing Sheets

APPARATUS FOR AUTOMATIC ADJUSTMENT OF THE LENGTH OF THE COMPARTMENTS OF THE CONVEYORS OF PACKAGING OR WRAPPING MACHINES

DESCRIPTION

The invention refers to compartment conveyors as used in packaging or wrapping machines and equipped with means of adjusting the length of the compartments so as to adapt it to the dimensions of the products to be handled. These conveyors are usually formed by at least two pairs of parallel identical adjacent chains, the front walls of the compartments being fixed to one pair of these chains while the rear walls of the same compartments are fixed to the other pair of chains. The sprockets of both pairs of chains are keyed to a common driving shaft, and the keying is direct for the sprockets of one pair of chains, while for is the sprockets of the other pair of chains the keying is via quick coupling and uncoupling means which when necessary enable one chain to be moved relative to the other in order to vary the distance between the said walls of the compartments. This adjustment is often performed by hand by at least two operators, one of whom releases the said coupling means and effects the relative movement of the pairs of chains, while the other operator checks when the distance between the walls of the compartments reaches the set value. Automatic adjustment systems also exist but these are structurally complicated, cumbersome and costly, partly because they require the use of a motor dedicated expressly to adjustment.

The invention seeks to solve the problem of the above-mentioned adjustment by means of a structurally simple and reliable construction based on the following idea for its solution. The driving shaft of the conveyor is connected to an electric motor of electronic speed and phase control type, and keyed directly to this shaft are the sprockets of one pair of chains while the sprockets of the other pair of chains are keyed to the ends of a hollow shaft mounted rotatably around the said driving shaft. Mounted flange-like on the mutually confronting faces of a neighbouring pair of sprockets placed on the driving shaft assembly are respective ring gears, e.g. with internal teeth, of equal diameter, with which there engages an externally toothed ring gear keyed to the projections, which pass through the windows of the inner sprocket, of a control sleeve mounted, with the possibility of axial movement, on the neighbouring end of the said hollow shaft and containing an annular recess in which are engaged the end rollers of a control lever which is pivoted to the frame of the conveyor and connected to a pivot servocontrol. When the conveyor is operating, the externally toothed ring gear is in an axial end-of-stroke position and is positioned between the two internally toothed ring gears so that the two pairs of chains are connected together. In order to carry out an adjustment of the form of the compartments of the conveyor, the conveyor is stopped and the externally toothed ring gear is moved axially to engage only with the ring gear keyed to the inner sprocket and is anchored to a fixed part so that the two driven chains are disconnected from the two driving chains. Following this, the conveyor motor is started in order to modify the distance between the walls of the compartments by the desired amount, after which it is stopped and the position of the said externally toothed ring gear is switched in order to reconnect the pairs of chains. If it is wished to align the centre line of the compartments of the conveyor with that of the product loading station, the conveyor motor is automatically restarted to re-establish this condition, with a movement equal to half of the previous movement performed for the correction and in the correct direction.

Figure 2:
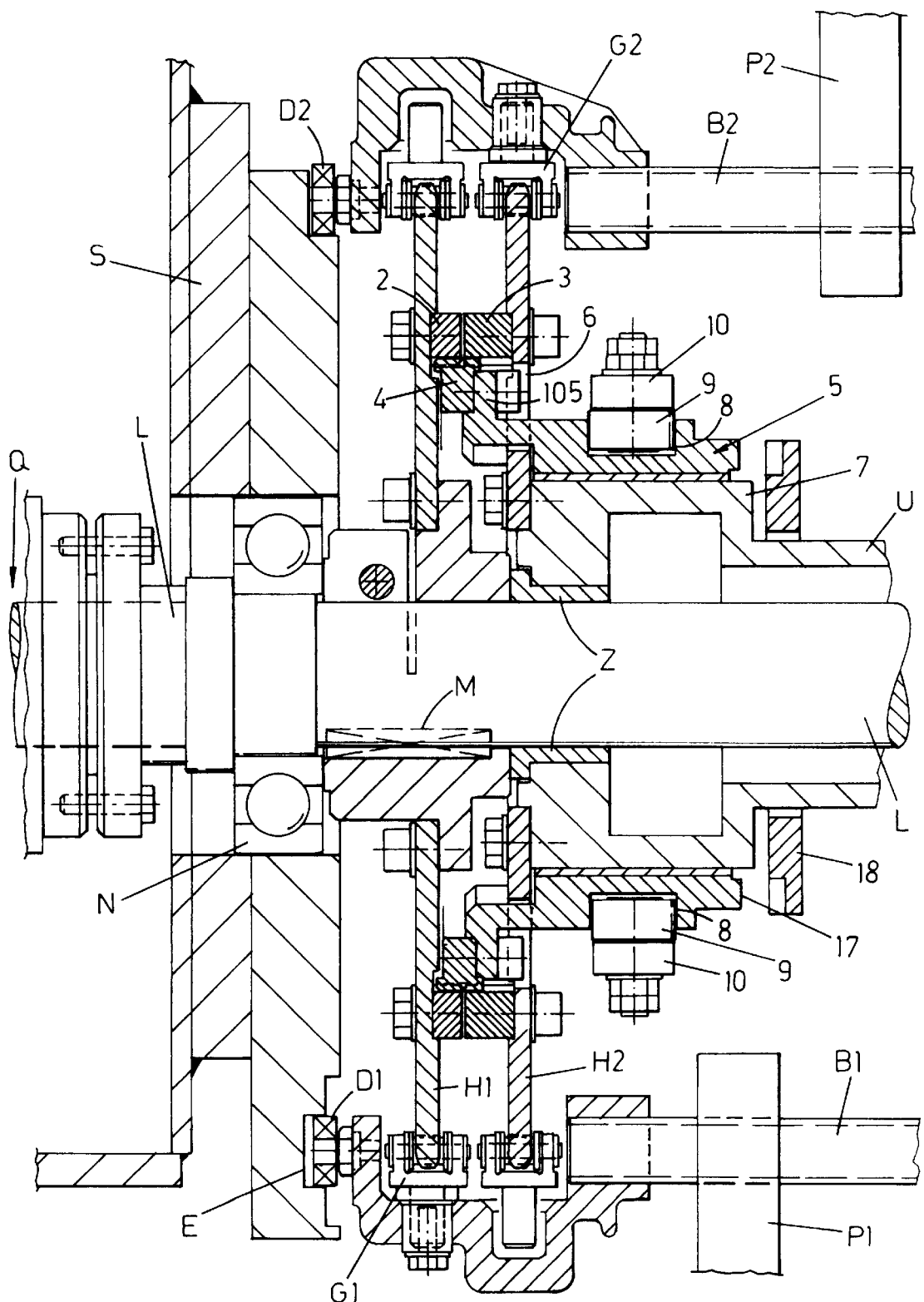
Figure 3:
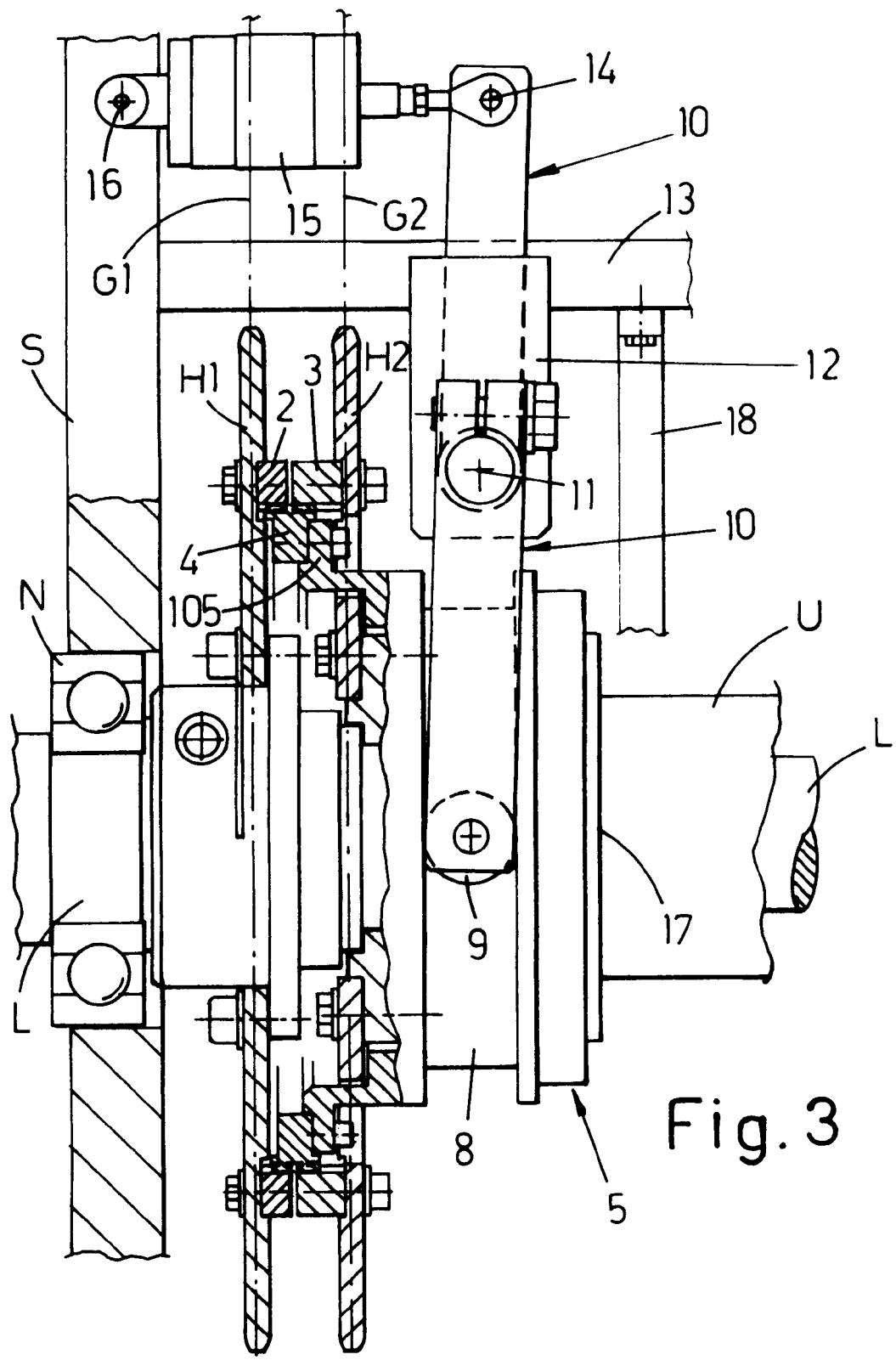

Further characteristics of the invention, and the advantages deriving therefrom, will be made clearer in the following description of a preferred embodiment which is illustrated by way of non-restrictive example in the figures of the attached sheets of drawings, in which:

FIG. 1 is a schematic side view of a compartment conveyor provided with the adjustment apparatus according to the invention; and FIGS. 2 and 3 illustrate further details of the apparatus viewed on cutting planes II—II and III—III, respectively, as marked in FIG. 1.

FIG. 1 illustrates a conveyor fitted with equidistant compartments C of adjustable size. The conveyor runs with an intermittent motion in the direction indicated by the arrow F to transfer groups of rolls of paper R arriving in single file from a production line X towards packaging means (not shown). While travelling along the lower side of the conveyor T, the compartments C stop centrally over the top of a hopper A of adjustable size, at the bottom of which there operates a lifter S which in the down position receives the rolls R from the transfer line X. With cyclical lifting and lowering, the lifter S stacks the rolls R in the hopper A and then inserts them into the above-arranged compartment C which is then moved along by the conveyor T to transfer the groups of rolls R, with the assistance of guides G, towards the packaging means, while a new compartment C is positioned over the hopper A for the repetition of the cycle described.

The rear walls P1 of the compartments C are supported by crossmembers B1, at the ends of which are stabilizer rollers D1 which, as they travel along the straight sides of the conveyor in question, run in straight fixed guides E, the said crossmembers being fixed to the links of a pair of parallel chains G1, only one of which is visible in FIG. 2. These chains travel around sprockets H1, one pair of which is keyed as indicated at M to the driving shaft L which is supported so that it can rotate in bearings N by the support structure S and which by means of a positive drive Q visible in FIG. 1, such as a sprocket and toothed belt, is connected to an electric drive motor 1 which, in the present case, is of the electronic speed and phase control type, e.g. a brushless motor. The front walls P2 of the compartments C, however, are supported by crossmembers B2 provided with stabilizer rollers D2 at their ends and fixed to the links of the pair of chains G2, only one of which can be seen in FIG. 2, these chains being passed around sprockets H2, one pair of which is keyed to the ends of a hollow shaft U mounted so that it can rotate upon the driving shaft L by means of brasses Z.

According to the invention, mounted flange-like on the mutually confronting faces of the sprockets H1 and H2 are ring gears 2 and 3, with e.g. internal teeth, separated by a short distance and having identical characteristics, except for different thicknesses, ring gear 3 attached to the inner sprocket H2 being thicker. Meshing with the teeth of the ring gears 2 and 3 is an externally toothed ring gear 4 whose thickness is greater than that of ring gear 2 and is equal to or slightly less than that of ring gear 3, so that when this ring gear 4 pushes against sprocket H1, the teeth of the said ring gear 4 lie astride the ring gears 2 and 3, which are thus coupled in motion so that the shaft L is simultaneously turning both sprocket H1 and sprocket H2. The ring gear 4 is mounted on angularly equidistant projections 105 which pass through arcuate slots of appropriate size 6 let into the body of the inner sprocket H2, these projections being integral with a sleeve 5 that slides axially on a suitable enlargement 7 of the end of the hollow shaft U. This sleeve includes an annular groove 8 in which are engaged the end rollers 9 of a forked lever 10 pivoting on an intermediate fulcrum on a vertical pin 11 supported rotatably by a support 12 fixed to a crossmember 13 which is fixed in turn by its ends to the sides of the support structure S of the conveyor T. Hinged to the end of the leg of the fork at 14 is a small reciprocating actuator 15, e.g. a fluid pressure-actuated cylinder-and-piston assembly, hinged at 16 to the neighbouring side of the base S. When the rod of the cylinder 15 is in the extended position, the control sleeve 5 is shifted left when viewing FIGS. 2 and 3 and the ring gear 4 is in the position of interconnection of the ring gears 2 and 3 as stated earlier. If on the other hand the rod of the cylinder 15 is retracted, the control sleeve 5 shifts axially towards the right and moves the ring gear 4 fully inside the ring gear 3, pushed against the sprocket H2 and leaving the adjacent ring gear 2 completely free to itself. At this stage it is preferable to provide for the free end face 17 of the sleeve 5 to be designed to be acted upon by friction or by engagement by a complementary part 18 which is fixed, e.g. to the crossmember 13 of FIG. 3. In this way the said sleeve 5 and the sprocket H2 attached to it remain stationary and cannot be accidentally moved out of position. If the parts 17 and 18 are of engaging type, their teeth are profiled on their opposing faces with lead-ins, in order that they can reliably engage whatever the angular position of the sleeve 5. The same applies to the ring gears 4 and 2 which will also be profiled on their opposing faces so that they mesh reliably when at a later stage the ring gear 4 is returned to the position of maximum displacement to the left as illustrated in the drawings. The radial-tooth dog clutch 2, 3, 4, also, will be characterized by having teeth of limited thickness, to limit the coupled rotation of ring gear 4 with ring gear 2 and the consequent modification of the adjustment brought about by means of the motor 1, as described earlier.

Lastly, it can be seen in FIG. 1 that the motor 1 of the apparatus is connected to the control panel 19 which regulates the operation of the machine and which, through an interface 20, controls the operation of the cylinder 15.

The apparatus described above operates as follows. Normally, as already stated, the rod of the cylinder 15 is extended and the ring gear 4 meshes with the ring gears 2, 3, so that the rotation of the shaft L is transmitted to both pairs of chains of the conveyor T with the compartments C having the predetermined length. To vary the length of the compartments, the data relating to the desired length are entered through the control panel and the adjustment process is initiated. This process takes the form of the following succession of working steps:

the conveyor T stops with one compartment C positioned centrally with respect to the hopper A;

the cylinder 15 retracts its rod to disengage the ring gear 4 from the ring gear 2 and prevent rotation of the ring gear 3 and of its associated sprocket H2, by the engagement of the control sleeve 5 with the stationary part 18, while special sensors (not shown) report to the control panel when the aforementioned conditions have been achieved;

the electric motor 1, with its associated electronic intelligence, starts up and rotates the shaft L with sprocket H1 in the necessary direction and by the necessary amount to move the walls P1 of the cells away from the fixed walls P2 until the length of the compartments is as desired, after which the said motor 1 stops;

the cylinder 15 is returned to the position in which its rod is extended so that the ring gear 4 is brought back into mesh with both the ring gear 3 and the ring gear 2; and if the centre line of the compartments is to be aligned with that of the loading hopper A, the electric motor 1 starts up again and moves the conveyor T with all its compartments by, for example, a distance equal to half the previously effected adjustment stroke, either forwards or backwards, depending on whether the compartments were previously enlarged or reduced.

From this moment, the motor 1 of the conveyor T will be able, because of the data entered via the control panel 19, cyclically to align one of the compartments with the hopper A which will itself have been adjusted by the known means.

What is claimed is:

1. Apparatus for automatic adjustment of the length of the compartments of the conveyors of packaging or wrapping machines, of the type in which the walls (P1 and P2) of the compartments are fixed to pairs of parallel chains (G1, G2) whose sprockets (H1, H2) are mounted on two common shafts, one of which hereinafter called the driving shaft (L) is connected to a drive motor, and in which the sprockets of one pair of chains are rigidly keyed to this driving shaft while the adjacent sprockets of the other pair of chains are operatively connected to the said first sprockets by means which allow the relative positions of the pairs of chains to be moved out of phase so as to vary the length of the compartments and adapt it to the form of the products to be packaged, characterized in that the sprockets keyed to the driving shaft (L) are the outermost ones (H1), hereinafter called the driving sprockets, while the innermost ones (H2), hereinafter called the driven sprockets, are fixed to the ends of a hollow shaft (U) mounted rotatably on the said driving shaft; and mounted on one end of this hollow shaft, in the section between the driven sprockets (H2), is an axially sliding control sleeve (5) with an annular groove (8) in which are engaged the end rollers of a forked lever (10) pivoted on an intermediate fixed support (12) and connected at the other end to a reciprocating actuator (15), the said control sleeve having, on its front face, angularly equidistant projections (105) passing through slots (6) shaped as sectors of circles obtained in the neighbouring driven sprocket (H2) of the conveyor, on which projections there is mounted, flange-like, the mobile component (4) of a dog clutch (2, 3, 4) which is normally in the engaged position, to connect the driving sprocket (H1) with the driven sprocket (H2); means being provided to control the said actuator (15) and the said driving shaft (L) in order to modify the distance between the walls of the compartments (C).

2. Apparatus according to claim 1, in which the dog clutch (2, 3, 4) is of the radial tooth type and has, mounted flange-like on the projections (105) of the control sleeve (5), a ring gear (4) with external teeth, which normally in a first position meshes in a bridge-like manner with a pair of internally toothed ring gears (2, 3) mounted flange-like coaxially on the opposing faces of the neighbouring driven (H2) and driving (H1) sprockets and which is such that when the said sleeve is moved axially to a second limit position, the said externally toothed ring gear comes into mesh with only the internally toothed ring gear (3) fixed to the driven sprocket (H2).

3. Apparatus according to claim 2, in which the control sleeve (5) is arranged with its front face (17) opposite the end face supporting the externally toothed ring gear (4), so that when this ring gear is disengaged from the internally toothed ring gear (2) attached to the driving sprocket (H1), the said sleeve is acted upon by a fixed mating part (18) that prevents unintentional movements of the driven sprockets (H2).

4. Apparatus according to claim 2, in which the toothed ring gears (2, 3) attached to the driving and driven sprockets (H1, H2) of the conveyor have identical characteristics but different thicknesses, the ring gear (3) attached to the driven sprocket (H2) being thicker, while the externally toothed ring gear (4) has a thickness equal to or slightly smaller than that of the said thicker, internally toothed ring gear (3), all in such a way that the externally toothed ring gear (4) can operate alternately bearing against one or the other of the sprockets (H1, H2) that carry the said ring gears of different thicknesses.

* * * * *